US008843936B2

(12) United States Patent
Kenkre et al.

(10) Patent No.: US 8,843,936 B2
(45) Date of Patent: Sep. 23, 2014

(54) AUTOMATICALLY IDENTIFYING CRITICAL RESOURCES OF AN ORGANIZATION

(75) Inventors: Sreyash D. Kenkre, Bangalore (IN); Sameep Mehta, New Delhi (IN); Krishnasuri Narayanam, Bangalore (IN); Vinayaka D. Pandit, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 13/483,492

(22) Filed: May 30, 2012

(65) Prior Publication Data
US 2013/0326531 A1  Dec. 5, 2013

(51) Int. Cl.
*G06F 9/46* (2006.01)
*G06Q 10/00* (2012.01)

(52) U.S. Cl.
USPC ........................................ 718/104; 705/7.12

(58) Field of Classification Search
CPC ....... G06F 9/52; G06F 9/5027; G06F 9/5038; G06Q 10/0631; G06Q 10/06313; G06Q 10/06
USPC ........................................................... 700/99
See application file for complete search history.

(56) References Cited

U.S. PATENT DOCUMENTS

| | | | |
|---|---|---|---|
| 5,276,876 A * | 1/1994 | Coleman et al. ............... 718/104 |
| 6,078,912 A | 6/2000 | Buerger et al. |
| 6,219,654 B1 | 4/2001 | Ruffin |
| 6,292,905 B1 | 9/2001 | Wallach et al. |
| 6,965,867 B1 | 11/2005 | Jameson |
| 7,146,353 B2 * | 12/2006 | Garg et al. ............................ 1/1 |
| 7,171,668 B2 * | 1/2007 | Molloy et al. ................. 718/105 |
| 7,444,635 B2 * | 10/2008 | Lehtinen ........................ 718/104 |
| 7,516,455 B2 | 4/2009 | Matheson et al. |
| 7,827,557 B2 | 11/2010 | Zhu et al. |
| 8,078,664 B2 * | 12/2011 | Radia et al. .................... 709/201 |
| 8,117,505 B2 * | 2/2012 | Sridharan et al. ............ 714/47.2 |
| 8,185,905 B2 | 5/2012 | Cook |
| 8,438,211 B2 * | 5/2013 | Radia et al. .................... 709/201 |
| 8,495,646 B2 | 7/2013 | Uchida |

(Continued)

OTHER PUBLICATIONS

Wold et al.; Risk Analysis Techniques; Disaster Recovery Journal; Retrieved from the Internet: <URL: http://www.drj.com/new2dr/w3_030.htm; retrieved Feb. 1, 2012; 7 pages.

(Continued)

*Primary Examiner* — Van Nguyen
(74) *Attorney, Agent, or Firm* — Schmeiser, Olsen & Watts, LLP; John Pivnichny

(57) ABSTRACT

A method and associated systems for automatically identifying critical resources in an organization. An organization creates a model of the dependencies between pairs of resource instances, wherein that model describes how the organization's projects and services are affected when a resource instance becomes unavailable. This model may be represented as a system of directed graphs. This model may be used to automatically identify a resource instance as "critical" when excessive cost is required to resume all projects and services rendered infeasible by the disruption of that resource instance. This model may also be used to automatically identify a resource instance as "critical for a resource type" when disruption of the resource instance forces the capacity of the resource type available to the entire organization to fall below a threshold value.

25 Claims, 3 Drawing Sheets

(56) References Cited

U.S. PATENT DOCUMENTS

| | | | |
|---|---|---|---|
| 8,661,447 B1* | 2/2014 | Olliff et al. | 718/104 |
| 2004/0064436 A1 | 4/2004 | Breslin et al. | |
| 2005/0144062 A1 | 6/2005 | Mittal et al. | |
| 2005/0165633 A1 | 7/2005 | Huber | |
| 2005/0240795 A1 | 10/2005 | Paller et al. | |
| 2007/0208799 A1 | 9/2007 | Hughes | |
| 2008/0091806 A1 | 4/2008 | Shen et al. | |
| 2009/0063234 A1 | 3/2009 | Refsland et al. | |
| 2010/0318846 A1 | 12/2010 | Sailer et al. | |
| 2010/0333002 A1 | 12/2010 | Karabey et al. | |
| 2013/0204983 A1 | 8/2013 | Kenkre et al. | |

OTHER PUBLICATIONS

Wallace, Simon; Planning; The ePM Book; Retrieved from the Internet: <URL: http://epmbook.com/planning.htm>; retrieved on Feb. 1, 2012; 19 pages.

Business Resumption and Contingency Planning Procedures; Retrieved from the Internet: <URL: http://www.myfpaa.org/IRM/Policy/IR-DisasterPlanning.htm>; retrieved Feb. 1, 2012; 5 pages.

Caglayan et al.; Activity Sequence Learning in Mission Critical Tasks; 2011 Proceedings of the 14th International Conference on Information Fusion (Fusion); Jul. 5-8, 2011; 8 pages.

Manktelow et al.; Risk Analysis: Evaluating and managing the risks that you face; Retrieved from the Internet: <URL: http://www.mindtools.com;pages/article/newTMC_07.htm>; retrieved on Feb. 1, 2012; 3 pages.

Jutte, Bart; 10 Golden Rules of Project Risk Management; Retrieved from the Internet: <URL: http://www.projectsmart.co.uk/10-golden-rules-of-project-risk-management.html>; retrieved on Feb. 1, 2012; 3 pages.

Business Continuity Planning Procedures and Guidelines; United States Agency International Development; Jun. 1, 2006; 5 pages.

Anonymous; A System and Method for Efficient and Effective Resumption of Organizational Operations during Disruptions; IP.com Prior Art Database Technical Disclosure; Jun. 21, 2011; 5 pages.

Cui et al.; Critical Resources Identification Constant Resource Constrained Projects;2006 IEEE International Conference on Systems, Man and Cybernetics; Oct. 8-11, 2006; 4 pages.

Fu, Song; Failure-Aware Construction and Reconfiguration of Distributed Virtual Machines for High Availability Computing; IEEE/ACM Intl. Symp. on Cluster Computing and the Grid, CCGrid, May 2009; 8 pages.

Verma et al.; CosMig: Modeling the Impact of Reconfiguration in a Cloud; 2011 IEEE 19th Annual International Symposium on Modelling, Analysis, and Simulation of Computer and Telecommunication Systems; Jul. 25-27, 2011; 9 pages.

Business Continuity Planning for Small to Medium-Sized Businesses and the Voluntary Organisations; Shropshire County Council, Emergency Planning Unit; 2008; 24 pages.

Business Continuity Software; Continuity Central; 2012; Retrieved from the Internet: <URL: http://www.continuitycentral.com/bsc.htm>; retrieved on Feb. 16, 2012; 1 page.

Enterprise Cloud Services; Cloud Computing, Disaster Recovery, Online Backup, Colacation—SunGard AS; Retrieved from the Internet: <URL: http://www.sungardas.com/pages/default.aspx>; retrieved on Feb. 16, 2012; 2 pages.

Business Continuity Plan Solutions; EverGreen Data Continuity, Inc.; Retrieved from the Internet: <URL: http://www.evergreen-data.com/>; retrieved on Feb. 16, 2012; 2 pages.

ErLogix Business Continuity Management System and Disaster Recovery Planning Solution (Home Page); ErLogix; Retrieved from the Internet: <URL: http://www.erlogix.com>; retrieved on Feb. 16, 2012; 2 pages.

Disaster Management Support (DMS) Programme; Indian Space Research Organisation; Retrieved from the Internet: <URL: http://www.isro.org/publications/pdf/DMSBrochure.pdf>; retrieved on Feb. 16, 2012; 4 pages.

ISRO Disaster Management System; 2008; Retrieved from the Internet: <URL: http://www.isro.org/scripts/disastermanagementsystem.aspx>; retrieved on Feb. 20, 2012; 1 page.

Office Action (Mail date May 17, 2013) for U.S. Appl. No. 13/366,438, filed Feb. 6, 2012.

Response (filed Jul. 9, 2013) for U.S. Appl. No. 13/366,438, filed Feb. 6, 2012.

Final Office Action (Mail date Oct. 9, 2013) for U.S. Appl. No. 13/366,438, filed Feb. 6, 2012.

Notice of Appeal (filed Mar. 5, 2014) for U.S. Appl. No. 13/366,438, filed Feb. 6, 2012.

Editor Ken Doughty, Business Continuity Planning (Book), McManus et al., Chapter 1, Risk and the Need for Business Continuity Planning, pp. 3-10, 2001.

Sally Meglathery, Editor Ken Doughty, Business Continuity Planning (Book), Chapter 11, Overview of Business Continuity Planning, pp. 83-84, 2001.

Carl B. Jackson, Editor Ken Doughty, Business Continuity Planning (Book), Chapter 14, The Business Impact Assessment Process, pp. 119-121, 2001.

* cited by examiner

AUTOMATICALLY IDENTIFYING CRITICAL RESOURCES OF AN ORGANIZATION

TECHNICAL FIELD

The present invention relates to automatically identifying critical resources in an organization.

BACKGROUND

Business-continuity planning is the process of ensuring that business functions remain uninterrupted despite the occurrence of natural, man-made, or environmental threats, and may involve building resilient systems that can overcome risks identified during system assessment.

Business-continuity planning may consist of the following steps:

1. Identifying and prioritizing business-critical systems, functions and resources;
2. Identifying critical resources;
3. Identifying potential threats and preventive controls to mitigate risk;
4. Designating responsibilities;
5. Implementing and maintaining a business-continuity plan; and
6. Validating the business-continuity plan.

The present invention pertains to step 2 of this business-continuity planning list.

BRIEF SUMMARY

A first embodiment of the present invention provides a method for automatically identifying critical resources of an organization, wherein said organization comprises a plurality of resource instances, wherein a resource instance of said plurality of resource instances is associated with a resource type of a plurality of resource types, wherein said organization comprises a plurality of projects, wherein a project of said plurality of projects comprises a demand for a capacity of a resource type of said plurality of resource types, and wherein a disruption of a first resource instance of said plurality of resource instances results in an unavailability of a unit of a second instance of said plurality of resource instances, said method comprising:

a processor of a computer system receiving one or more dependency relationships, wherein a dependency relationship of said one or more dependency relationships relates an independent resource instance of said plurality of resource instances with a dependent resource instance of said plurality of resource instances, and wherein a disruption of said independent resource instance results in an unavailability of a unit of said dependent resource instance;

said processor determining a disrupted capacity of a disrupted resource type of said plurality of resource types, wherein said disrupted capacity is a function of an initial disruption of an initially disrupted resource instance of said plurality of resource instances, and wherein said disrupted capacity is a further function of said one or more dependency relationships;

said processor categorizing said initially disrupted resource instance as being critical for said disrupted resource type, wherein said categorizing is a function of said disrupted capacity of said disrupted resource type.

A second embodiment of the present invention provides a computer program product, comprising a computer-readable hardware storage device having a computer-readable program code stored therein, said program code configured to be executed by a processor of a computer system to implement a method for automatically identifying critical resources of an organization, wherein said organization comprises a plurality of resource instances, wherein a resource instance of said plurality of resource instances is associated with a resource type of a plurality of resource types, wherein said organization comprises a plurality of projects, wherein a project of said plurality of projects comprises a demand for a capacity of a resource type of said plurality of resource types, and wherein a disruption of a first resource instance of said plurality of resource instances results in an unavailability of a unit of a second instance of said plurality of resource instances, said method comprising:

a processor of a computer system receiving one or more dependency relationships, wherein a dependency relationship of said one or more dependency relationships relates an independent resource instance of said plurality of resource instances with a dependent resource instance of said plurality of resource instances, and wherein a disruption of said independent resource instance results in an unavailability of a unit of said dependent resource instance;

said processor determining a disrupted capacity of a disrupted resource type of said plurality of resource types, wherein said disrupted capacity is a function of an initial disruption of an initially disrupted resource instance of said plurality of resource instances, and wherein said disrupted capacity is a further function of said one or more dependency relationships;

said processor categorizing said initially disrupted resource instance as being critical for said disrupted resource type, wherein said categorizing is a function of said disrupted capacity of said disrupted resource type.

A third embodiment of the present invention provides a computer system comprising a processor, a memory coupled to the processor, and a computer-readable hardware storage device coupled to said processor, said storage device containing program code configured to be run by the processor via the memory to implement a method for automatically identifying critical resources of an organization, wherein said organization comprises a plurality of resource instances, wherein a resource instance of said plurality of resource instances is associated with a resource type of a plurality of resource types, wherein said organization comprises a plurality of projects, wherein a project of said plurality of projects comprises a demand for a capacity of a resource type of said plurality of resource types, and wherein a disruption of a first resource instance of said plurality of resource instances results in an unavailability of a unit of a second instance of said plurality of resource instances, said method comprising:

a processor of a computer system receiving one or more dependency relationships, wherein a dependency relationship of said one or more dependency relationships relates an independent resource instance of said plurality of resource instances with a dependent resource instance of said plurality of resource instances, and wherein a disruption of said independent resource instance results in an unavailability of a unit of said dependent resource instance;

said processor determining a disrupted capacity of a disrupted resource type of said plurality of resource types, wherein said disrupted capacity is a function of an initial disruption of an initially disrupted resource instance of said plurality of resource instances, and wherein said disrupted capacity is a further function of said one or more dependency relationships;

said processor categorizing said initially disrupted resource instance as being critical for said disrupted resource type, wherein said categorizing is a function of said disrupted capacity of said disrupted resource type.

A fourth embodiment of the present invention provides a process for supporting computer infrastructure, said process comprising providing at least one support service for at least one of creating, integrating, hosting, maintaining, and deploying computer-readable program code in a computer system, wherein the program code in combination with the computer system is configured to implement a method for automatically identifying critical resources of an organization, wherein said organization comprises a plurality of resource instances, wherein a resource instance of said plurality of resource instances is associated with a resource type of a plurality of resource types, wherein said organization comprises a plurality of projects, wherein a project of said plurality of projects comprises a demand for a capacity of a resource type of said plurality of resource types, and wherein a disruption of a first resource instance of said plurality of resource instances results in an unavailability of a unit of a second instance of said plurality of resource instances, said method comprising:

a processor of a computer system receiving one or more dependency relationships, wherein a dependency relationship of said one or more dependency relationships relates an independent resource instance of said plurality of resource instances with a dependent resource instance of said plurality of resource instances, and wherein a disruption of said independent resource instance results in an unavailability of a unit of said dependent resource instance;

said processor determining a disrupted capacity of a disrupted resource type of said plurality of resource types, wherein said disrupted capacity is a function of an initial disruption of an initially disrupted resource instance of said plurality of resource instances, and wherein said disrupted capacity is a further function of said one or more dependency relationships;

said processor categorizing said initially disrupted resource instance as being critical for said disrupted resource type, wherein said categorizing is a function of said disrupted capacity of said disrupted resource type.

DETAILED DESCRIPTION

Figure 1:
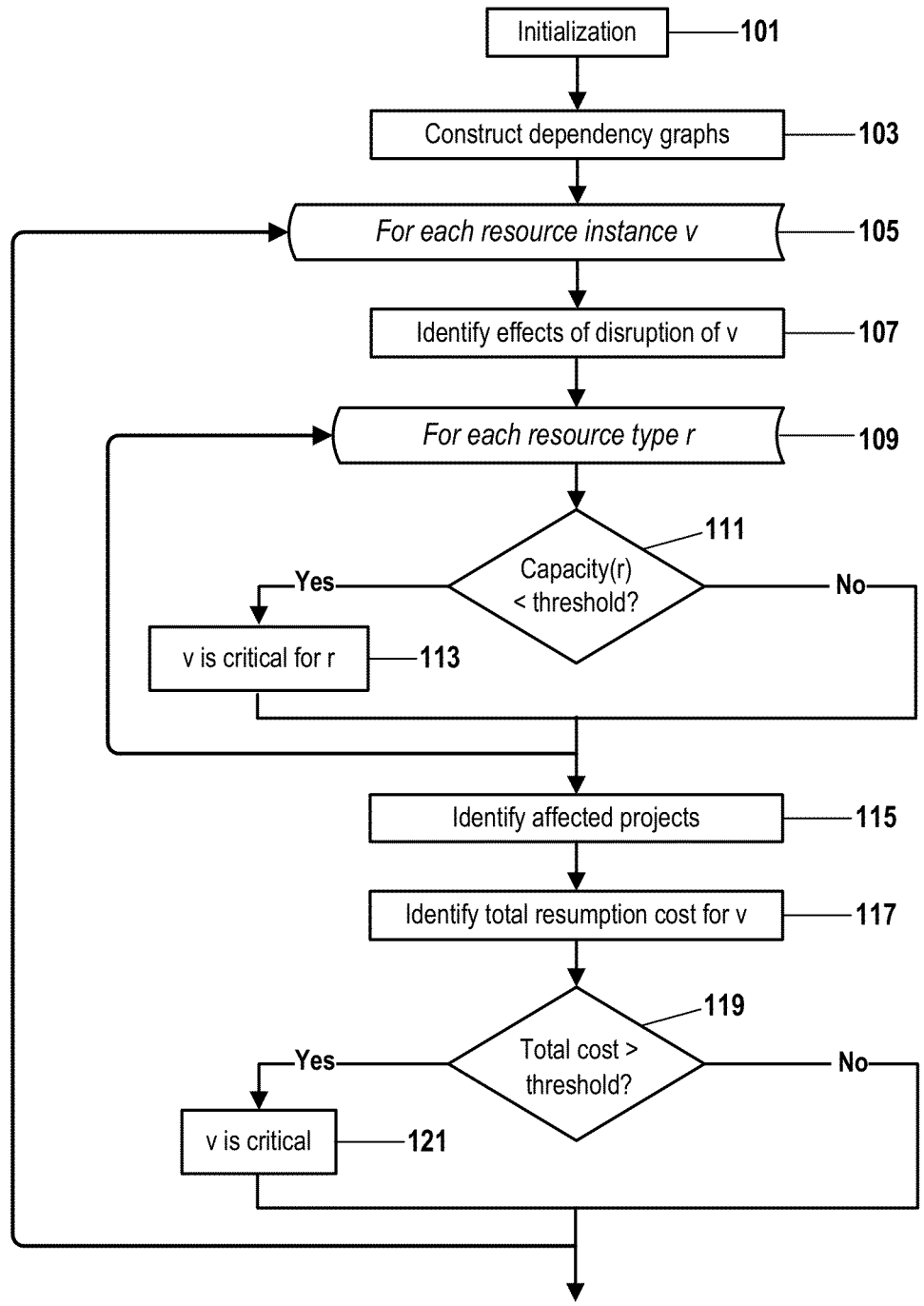
FIG. 1 is a flow chart that illustrates a method for automatically identifying the critical resources of an organization, wherein said method conforms to embodiments of the present invention.

Embodiments of the present invention provide a method, computer program product, computer system, and process for automatically identifying the critical resources of an organization.

Aspects of the present invention may be components of a larger business-continuity plan, wherein such a plan is designed to help an organization maintain acceptable levels of service during a crisis.

An organization may leverage a network of resources in order to maintain one or more "projects," wherein a project may be associated with a service provided to the organization's clients. A project may require one or more instances of one or more types of resources, and a minimum threshold capacity value may be associated with a combination of a project and a resource instance. If the capacity of a resource instance available to a project falls below the minimum threshold capacity value associated with the project and the resource instance, the project may be rendered "infeasible," or unable to provide a service.

Capacity of a resource type or resource instance may be measured in any appropriate units. In examples, a capacity of a resource type "network bandwidth" may be measured in units of Kbps or Mbps, the capacity of a resource type "lighting" may be measured in lumens, and the capacity of a resource instance "data center rack space" may be measured in linear feet, number of open rack units, or square meters.

A resource type may be associated with many resource instances, but a resource instance may be associated with no more than one resource type. The selection of a resource type to be associated with a resource instance may be a function of the primary type of service provided by the resource instance. A resource type may be associated with more than one project. A resource instance may be associated with more than one project.

Resource types may include, but are not limited to, wireless communications bandwidth, network-backbone bandwidth, network switches, electrical power, computer data storage, fuel reserves, heaters, air-conditioners, floor space, inventory, capital, consumables, and personnel.

Resource instances may include, but are not limited to, a particular computer data center's electrical power (a possible instance of a resource type "electrical power"), a RAID disk-drive array (a possible instance of a resource type "computer data storage"), a field of oil tanks (a possible instance of a resource type "fuel reserves"), and help-desk technicians (a possible instance of a resource type "personnel").

Resource types and resource instances may vary significantly from the above examples. An entity that is considered a resource type in one embodiment may be considered a resource instance in another embodiment.

An allocation procedure contains rules that specify how one or more resource instances may be assigned to one or more projects. In an example, an Internet Service Provider organization might operate a service or project P that provides 1 Mbps of network bandwidth to a customer. If project P requires resource types "computer," "power," "bandwidth," and "computer personnel" to provide this service, then an allocation procedure A0 might fill P's requirements with assets that represent resource instances of the resource types required by P. A0 thus might allocate to P a communications server CS-201 (an instance of "computer" resource type), site electric power (an instance of resource type "power"), 1 Mbps of bandwidth on the organization's Ethernet LAN L01-4 (an instance of resource type "bandwidth"), and a system administrator (an instance of resource type "computer personnel").

In another example, a project P1 may require exclusive access to a "server" resource type configured with a unit license of a "network-management software" resource type. An allocation procedure A1 might comprise instructions to allocate to P1 a server 302-2 located in building S302, to install a licensed copy of Rev. 2.1 network-management software on server 302-2, and to restrict access to server 302-2 such that no other project may access 302-2's services.

The above examples should not be construed to limit the complexity of or the ways in which allocation procedures may be implemented in embodiments of the present invention. The business needs and internal structure of an organization may dictate the form and content of the organization's allocation procedures. Allocation procedures may be recorded on different media and may comprise complex or conditional steps, depending on the organization's needs and internal structure. The content of an allocation procedure may be determined or influenced by implementation-dependent prioritization factors, conditional steps, and other guidelines or constraints incorporated into allocation procedures.

Subtle or complex allocation procedures may be fully or partially determined by or may comprise functions of the organizational, technical, or contractual constraints and priorities of one or more projects. An allocation procedure may comprise functions of the organizational, technical, or contractual constraints and priorities of all or of some part of the organization.

An allocation procedure may describe how instances of resources are allocated or reallocated to one or more projects in response to a disruption of one or more resource types or of the unavailability of one or more resource instances. A disruption of a resource instance may result in an unavailability of one or more units of one or more instances of one or more resource types.

A disruption of, or the unavailability of one or more resource instances, is called a "scenario." Scenarios may comprise, but are not limited to, natural or manmade disasters, malicious attacks, software failures, equipment outages, scheduled maintenance operations, or worker unavailability. Planning ways to maintain business continuity during a scenario requires a way to identify "critical" resource instances necessary to keep an organization's projects and services functional.

In practice, identifying critical resource instances may be a complex procedure that requires understanding of subtle, dynamic relationships among resource types, resource instances, projects, and organizational constraints, commitments, and priorities. Such identifying is often performed manually by members of the organization familiar enough with the organization's operations and structure to make educated guesses about resource criticality. Embodiments of the present invention improve upon such methods by accurately, deterministically, and automatically identifying critical resources.

In embodiments of the present invention, a minimum-capacity threshold value $ThrCap_r$ may be associated with a resource type r, wherein $ThrCap_r$ specifies the minimum capacity of resource type r required by an organization. Resource instance v may be identified as "critical for resource type r" if disruption of resource instance v directly or indirectly reduces resource type r's total capacity to a value less than r's minimum-capacity threshold value $ThrCap_r$. The words used to express this identification may vary, but the underlying meaning remains the same: the availability of sufficient capacity of resource instance v is necessary to maintain critical capacity of resource type r.

A project P that requires k resource types may be expressed as an ordered pair (D,C), wherein $D=(d_1, d_2, d_3, \ldots d_k)$ and each project resource-type capacity threshold value $d_i$ equals the minimum number of units of resource type i needed by P, and wherein C is a set of additional constraints on the ways that a unit of a resource type may be used by the organization, wherein said unit of a resource type is required by project P.

P may be rendered "infeasible" (that is, P may become unable to provide its primary service) when the capacity of a resource type i available to P falls to a level such that it is not possible to allocate $d_i$ units of resource type I to project P.

In another embodiment, when a project P requires a resource instance i, P and i may be associated with a project resource-instance capacity threshold value $ThrPrj_{P,i}$. P may be rendered infeasible when a capacity of resource instance i available to P falls below the value of $ThrPrj_{P,i}$. In other embodiments, reduction of a capacity of a resource type r may result in a reduction of the capacity of a resource instance i available to P, wherein resource instance i is an instance of resource type r.

In an example, project P's requirements for resource type "bandwidth" might be associated with a project resource-type capacity threshold value $d_{P,bw}=1$ Mbps. If equipment failures disrupt resource type "bandwidth" such that it becomes impossible to allocate 1 Mbps of resource type "bandwidth" to project P, then P may become infeasible and the organization could no longer rely on P to service a customer with 1 Mbps of bandwidth.

When a project P is rendered infeasible by insufficient capacity of a resource type r, that project P may be able to resume operation by substituting available units of one or more other resource types in place of unavailable units of resource type r. Such a resumption may incur resumption costs.

A procedure for resuming an infeasible project may be described in one or more resumption plans. A resumption plan may comprise constraints upon ways of substituting resource types or resource instances in order to resume an infeasible project. Such constraints may be described in one or more substitutability rules, as described below.

In an example, a power failure may render a project P infeasible by reducing the capacity of resource type "bandwidth" such that it is impossible to satisfy P's requirement for 1 Mbps of resource type "bandwidth." In such a case, however, it might be possible to resume P by substituting available units of resource type "wireless bandwidth" for some or all unavailable required units of disrupted resource type "bandwidth." Such substitution might incur costs that may be a function of the tasks of switching the project to a substitute network and of installing substitute software on P's server. In addition to these "substitution costs," some embodiments may also experience a project-specific "time-delay cost," wherein the time-delay cost may be a function of the amount of project downtime required to effect the substitution.

Resumption costs may be a function of a subset of substitution costs, time-delay costs, and other types of costs that may be directly or indirectly related to project resumption.

In an example, a project P may, during normal operation, comprise two resources: i) a server configured with Rev. 2.1 network-management software; and ii) exclusive access to a high-speed LAN. If P becomes infeasible under a scenario S, wherein S renders P's server and dedicated LAN unavailable, a resumption plan R might comprise instructions to restore P to operation under scenario S by: i) allocating to P the services of server M-25 located in building MEBP4; ii) installing Rev. 2.1 network-management software on server M-25; iii) switching the high-speed LAN of building MEBP4 to project P; and iv) stalling any other project that may require the high-speed LAN of building MEBP4.

The above example should not be construed to limit the ways that resumption plans may be implemented or recorded. Depending on an organization's needs and internal structure, a resumption plan may be created in different types of formats, may be stored on different types of media, and may comprise complex or conditional steps. A resumption plan may address multiple simultaneous, concurrent, or overlapping scenarios.

A scenario may reduce the available capacity of a resource type or instance, such that a remaining capacity of a resource type or instance is insufficient to meet the needs of all projects. In a simple example, if scenario S1 reduces a total capacity of a resource type "bandwidth" to 500 Kbps, then a project that requires 1 Mbps of resource type "bandwidth" must be rendered infeasible. In another example, if capacity of resource type "bandwidth" drops to 400 Kbps, a resumption plan might comprise rules that determine how to allocate bandwidth between two projects that each need 300 Kbps of bandwidth.

Resumption plans may comprise subtle or complex allocation rules and resource-substitution rules, wherein at least one of those allocation and substitution rules may be influenced by or determined as a function of one or more constraints $C_{i,j}$ of one or more projects $P_i=(D,C)$. Resumption-plan rules may be facilitated by implementation-dependent prioritization factors, conditional steps, and other guidelines or constraints comprised within allocation procedures.

A project P may be associated with a project resumption-cost threshold value $ThrRes_P$. In such embodiments, a resource instance v may be identified as "critical" if, should disruption of a resource instance v directly or indirectly render P infeasible, a total cost $Cost_P$ to resume project P exceeds P's resumption-cost threshold $ThrRes_P$.

If a project P requires more than one resource instance, an analogous project resumption-cost threshold value $ThrRes_{P,r}$ may specify a distinct resumption-cost threshold associated with a resource instance-specific cost to resume P, wherein said resource instance-specific cost is a function of a direct or indirect effect of a disruption of only a resource instance r.

An organization may define a global resumption-cost threshold value $ThrRes_v$, wherein a value of $ThrRes_v$ identifies a threshold value for a sum of all resumption costs of every project that is directly or indirectly rendered infeasible (or "affected") by a disruption of a resource instance v. A resource instance v may be identified as "critical" if the value of $ThrRes_v$ is exceeded by a cost to resume all projects affected by the disruption of resource instance v. In an embodiment, a resource instance v may be identified as "critical" if the value of $ThrRes_v$ is exceeded by a cost to resume a subset of affected projects, wherein said subset of affected projects is disrupted when disruption of resource instance v directly or indirectly renders one or more projects of the organization infeasible.

Organizational personnel may define values of $ThrRes_P$ (which contains a threshold value, as described above, for the resumption cost of a single project P affected by a disruption of a resource instance v) or $ThrRes_v$ (which contains a threshold value, as described above, for the total resumption cost of all projects affected or of a subset of all projects affected by a disruption of a resource instance v).

Two resource instances may be related by a dependency relationship, wherein the total or partial disruption of a first ("independent") resource instance may result in the total or partial disruption of a second ("dependent") resource instance.

In an example, an organization may define a dependency relationship that identifies a "communications server CS-241" resource instance as being dependent upon a "power bus B-243-A" resource instance. Such a dependency might allow the organization to predict that, if a project P requires communications server CS-241, then project P would be rendered infeasible by a failure of power bus B-243-A.

In embodiments, a dependency relationship may define a relationship between a first dependent resource instance and a second independent resource instance wherein the capacity of the first dependent resource instance is reduced, but not completely eliminated, by a reduction in capacity or a complete unavailability of the second independent resource instance.

Resource dependencies may be limited to directional relationships. In an example, a dependency relationship that identifies a server resource instance as unavailable during the failure of a power resource instance does not imply a converse dependency that would make the power resource instance dependent upon the availability of the server resource instance.

Dependencies may be transitive. If, for example, resource instance A depends upon resource instance B, and resource instance B depends upon resource instance C, then A may depend upon C. In an example, if the availability of a bandwidth resource instance depends upon the availability of a server resource instance and the availability of the server resource instance depends upon the availability of a power resource instance, then the bandwidth resource instance becomes unavailable when the power resource instance fails.

Dependency relationships may be represented as one or more data structures or mathematical objects, such as an array or matrix.

A set of dependency relationships that identify a plurality of resource instances upon which a resource instance u is dependent may be represented as a directed graph. A directed graph is a mathematical structure comprised of: i) a set of values called nodes or vertices; and ii) a set of ordered pairs of those nodes. Each ordered pair is called an edge and the order of a pair of nodes in an edge defines the direction of a one-way relationship between those two nodes.

In an example, a directed graph DG might contain a set of nodes that comprise the first five letters of the alphabet, and a set of four edges that each define the sequence in which an adjacent pair of letters are ordered in the alphabet:

$$DG=(\{A,B,C,D,E\},\{(A,B),(B,C),(C,D),(D,E)\})$$

In this example, each edge defines an alphabetic-ordering relationship between two adjacent letters such that the alphabetic position of the first node of an edge immediately precedes the alphabetic position of the second node of that edge. Because the relationship defined by an edge of a directed graph depends upon the order of the edge's nodes, interchanging two letters in any of DG's edges would destroy DG's alphabetic ordering.

A set of dependency relationships that identify resource instances upon which a resource instance u is dependent may be represented as a directed graph $G_u$, wherein $G_u$ may be known as a "dependency graph" associated with resource instance u. Such a dependency graph $G_u$ comprises a set of nodes $\{u, v_1, v_2, \ldots v_n\}$ and a set of edges that each contain an ordered pair of two nodes.

In such a graph $G_u$, every edge comprises the node u and a node $v_i \in \{v_1, v_2, \ldots, v_n\}$, wherein $v_i$ represents a resource instance i≠u upon which u depends and wherein each $v_i$ is included in exactly one edge. In such a graph, an $i^{th}$ edge thus may describe a dependency relationship between the dependent resource instance u and an independent resource instance i. In such embodiments, such a directed graph $G_u$ may specify that node u may function at full capacity only when all of nodes $v_1, v_2, \ldots, v_n$ function properly.

In some embodiments, the first node of each edge in a dependency graph represented as a directed graph may denote a dependent resource instance and the second node in each said edge may denote an independent resource instance upon which the first node depends. In other embodiments, the order of the two nodes in each edge may be reversed. But in all such cases, the ordering must be consistent among all edges in a dependency graph represented as one or more directed graphs.

In an example, if resource instance u depends upon resource instances a, b, and c, an associated dependency graph $G_u$ might comprise:

$$G_u=(\{u,a,b,c\},\{(u,a),(u,b),(u,c)\})$$

A scenario that comprises an initial disruption of a single resource instance u may, through dependency relationships, result in a direct or indirect disruption of other resource instances. Traversing an organization's dependency graphs may identify other resource instances that are directly or indirectly disrupted as a result of a disruption of resource instance u. Such a set of disrupted resource instances may be used to predict the initial disruption's cascading direct and indirect effects on projects that require disrupted resource instances, wherein said disrupted resource instances are directly or indirectly disrupted when resource instance u is disrupted.

An organization may define a unique geographic hierarchy graph G1, wherein G1 may be represented as a rooted acyclic directed tree with all edges directed away from the root. In other embodiments, G1 may be represented as a different type of abstract or mathematical object or model.

If G1 is represented as a directed graph, each node or vertex of G1 may represent a physical or virtual location and each edge may comprise an ordered pair of nodes, wherein a first node of an ordered pair represents a more narrowly defined location and a second node of the ordered pair represents a less narrowly defined representation of the same location. In some embodiments, the order of nodes in each edge may be reversed, but in all such cases, the ordering must be consistent among all edges of a geographic hierarchy graph represented as a directed graph. The nodes or vertices of a geographic hierarchy graph as a directed graph may represent geographic locations associated with an organization's projects, assets, resources, or other entities.

The root node of a directed graph that represents a geographic hierarchy graph may contain a value that identifies the most general description of a location of the organization. In embodiments, this root value may identify the country in which an organization is headquartered.

A complete path through such a geographic hierarchy graph represented as a directed graph might comprise a directed path from a root node that contains a value that represents the country in which the organization's headquarters resides to a leaf node that contains a value that represents the graph's most narrow representation of a location of one of the organization's projects, assets, resource instances, or other entity.

In one example, an edge of a geographic hierarchy graph represented as a directed graph might comprise an ordered pair of nodes that identify a location of a regional switching hub in the borough of Manhattan in New York City. In this example, a first (more general) node of a first edge might contain a value that represents New York State. A second (less general) node of the first edge might contain a value that represents New York City. A second edge that extends the directed path of the first edge might comprise an ordered pair of: i) a more general first node that contains a value representing New York City; and ii) a less general node that contains a value that represents a New York City street address of a regional switching hub.

If G1 is represented by an acyclic object or model, no path through edges of G1 may traverse a same node more than once. All directed paths through a geographic hierarchy graph represented as a directed graph may extend from the graph's unique root node through one of the graph's leaf nodes.

An organization may require only one geographic hierarchy graph or only one set of geographic hierarchy graphs, wherein said graph or graphs may be used to estimate a cost to substitute units of an available resource instance for units of an unavailable resource instance, wherein that cost may be a function of a number of edges along a directed path of the geographic hierarchy graph, and wherein said directed path connects a node of the graph that represents a unit of the replaced or disrupted resource instance with a node of the graph that represents a unit of the replacing or substituting resource instance.

An initial result of a dependency-graph analysis under a condition specified by one or more scenarios may be modified by one or more substitutability rules that may specify a condition under which available units of a replacing or substituting resource type or of a replacing or substituting resource instance may replace an unavailable unit of a replaced or disrupted resource instance.

A substitutability rule may allow an organization to resume a project rendered infeasible by a direct or indirect effect of a resource-instance disruption, wherein said substitutability rule enables said resumption by stating constraints upon the ways that an unavailable unit of an instance of a replaced or disrupted resource type may be replaced by available units of one or more instances of one or more replacing or substituting resource types. Substitutability rules may be used to predict or estimate a project-resumption cost, wherein said project-resumption cost may be a function of a cost to resume one or more projects that had been rendered infeasible by a direct or indirect effect of a disruption of one or more resource instances.

A substitutability rule may permit a project to resume even when two or more scenarios overlap or occur simultaneously or concurrently. Consider, for example, a scenario S1 that renders a project P1 infeasible because of insufficient capacity of an instance of resource type t under S1; and a scenario S2 that renders a project P2 infeasible because of insufficient capacity of an instance of resource type u. It may be possible to return one or both projects to feasibility by shifting available units of instances of resource type u from P1 to P2 or by shifting available units of instances of resource type t from P2 to P1.

Such a solution fails when a total available capacity of instances of either resource type t under scenario S1 or of resource type u under scenario S2 is too low to satisfy the requirements of all projects. But even in such cases, it may be possible to resume one or more infeasible projects by substituting units of other types of resources for unavailable units of resource type t or resource type u.

If, for example, 500 Kbps of available resource type "WiFi bandwidth" cannot satisfy the requirements of either of two projects that each require 600 Kbps of WiFi bandwidth, a substitutability rule may enable both projects to resume by allowing the unavailable 700 Kbps of WiFi bandwidth to be replaced by an 700 Kbps of an instance of an available resource type "satellite bandwidth." In another example, a project that requires resource type "mainframe computer" may be resumed even if no "mainframe computer" resources are available if a substitutability rule allows the substitution of an available instance of available resource type "Linux workstation" for unavailable units of the unavailable "mainframe computer" resource type.

A substitutability rule may specify a general relationship between resource types, wherein said general relationship may permit a first number of units of an available resource type to be substituted for a second number of units of an unavailable resource type. Such a substitutability rule may be expressed as:

$$\{R\text{type},(\text{type}_1,\text{vol}_1), (\text{type}_2,\text{vol}_2), (\text{type}_3,\text{vol}_3), \ldots), (\text{type}_n,\text{vol}_n)\}$$

where Rtype identifies the unavailable resource type that is to be replaced, and each ordered pair ($\text{type}_i$, $\text{vol}_i$) specifies that one unit of resource type Rtype may be replaced by $\text{vol}_i$ units of resource type $\text{type}_i$.

A set of substitutability rules may not be transitive, meaning that a first rule stating that units of a resource type A may replace a unit of a resource type B and a second rule stating that units of resource type B may replace a unit of a resource type C, does not necessarily imply that units of A may replace one or more units of C. Substitutability rules may be directional, meaning that a substitutability rule stating that units of a resource type A may replace units of a resource type B does not necessarily imply that a number of units of B may replace another number of units of A.

In some embodiments, a substitutability rule may define a relationship between a pair of resource instances. A plurality of substitutability rules may describe constraints upon ways that units of instances of a first plurality of resource types may jointly replace units of instances of a second plurality of resource types.

A substitutability rule might comprise the following statement:

$$\{\text{bandwidth},(\text{shared cable bandwidth},1.5)\}$$

This rule specifies that 1.5 units of resource type "shared cable bandwidth" may be substituted for an unavailable unit of resource type "bandwidth." If project P requires a 1 Mbps instance of resource type "bandwidth," P would initially become infeasible under scenarios that reduce available bandwidth capacity to 900 Kbps, which is 100 Kbps short of P's requirement. But if a 150 Kbps instance of resource type "shared cable bandwidth" is available, the above substitutability rule might allow P to resume by substituting 1.5 units of resource type "shared cable bandwidth" for each unavailable required unit of resource type "bandwidth."

Substitutions may incur substitution costs and time-delay costs. Substitution costs and time-delay costs may be a direct or indirect function of a distance between a physical location of an available unit of a substituting resource instance and a physical location of an unavailable unit of a disrupted, replaced resource instance. In embodiments of the present invention wherein a cost analysis may identify a resource instance as being critical or as being critical for a resource type, said identifying may be implemented as a function of a substitution cost or a time-delay cost.

In summary:
$\text{ThrCap}_r$ is the minimum available capacity of resource type r required by an organization A resource instance v is identified as "critical for resource r" if disruption of v directly or indirectly reduces the available capacity of resource type r to a value less than $\text{ThrCap}_r$.

A project P that consumes k resource types may be expressed as (D,C), wherein:
  $D=(d_1, d_2, d_3, \ldots, d_k)$
  $d_r$=the minimum capacity of resource type r required by P, and
  C is a set of additional constraints on resource usage.
$\text{ThrRes}_v$ is the cost to resume all projects rendered infeasible by a disruption of resource instance v.

Resource instance v is identified as "critical" if a cost to resume all projects affected by a disruption of v results in a resumption cost greater than a resumption-cost threshold $\text{ThrRes}_v$.

A dependency graph $G_v$ states dependency relationships wherein disruption of one or more independent resource instances results in disruption of a dependent resource instance v.

G1 is a geographic hierarchy graph that represents a geographic distribution of an organization's resources.

Substitutability rule R={Rtype, ($\text{type}_1$, $\text{vol}_1$), ($\text{type}_2$, $\text{vol}_2$), ... ($\text{type}_n$, $\text{vol}_n$)}, where:
  Rtype=an unavailable resource type that is to be replaced, and
  ($\text{type}_i$, $\text{vol}_i$)→1 unit of Rtype may be replaced by $\text{vol}_i$ units of resource type $\text{type}_i$.

FIG. 1 is a flow chart that illustrates a method for automatically identifying the critical resources of an organization, wherein said method conforms to embodiments of the present invention. FIG. 1 includes steps 101-121.

A resource instance v may be identified as "critical for resource type r" if disruption of resource instance v reduces a capacity of resource type r to a value below a minimum-capacity threshold $\text{ThrCap}_r$, wherein said $\text{ThrCap}_r$ may specify a minimum available capacity of r required by the organization. In a trivial case, resource instance v may be an instance of resource type r.

A resource instance v may be identified as "critical" if a total resumption cost to resume all projects that have been directly or indirectly rendered infeasible by a disruption of resource instance v exceeds the value of a resumption-cost threshold $\text{ThrRes}_v$. In some embodiments, a resource instance v may also be identified as "critical" if it is identified as "critical for a resource type r" according to the criteria described in the preceding paragraph. In some embodiments, a resource instance v may be identified as "critical" instead of being identified as "critical for a resource type r" if that resource instance v satisfies the criteria described in the preceding paragraph.

In step 101 of FIG. 1, the system is initialized for an organization. Initialization may comprise modeling some or all of the business functions of the organization, wherein said modeling may include, but not be limited to, defining entities and values that may include, but are not limited to projects and services, resource types, resource instances, associations between resource types and resource instances, threshold values, substitutability rules, resource dependency relationships, allocation procedures, resumption plans, one or more geographic hierarchy graphs, constraints on the use of resource types, constraints on the use of resource instances, and other parameters, definitions, structures, values, rules, thresholds, and procedures that an organization may deem necessary and that conform to embodiments of the present invention.

Defined threshold values may include but are not limited to any threshold values necessary for correct operation of embodiments of the present invention, including, but not limited to, a resource-type capacity threshold value $\text{ThrCap}_r$, as described above, for a resource type r, a resource-type capacity threshold value $d_{P,r}$, as described above, for a resource type r required by a project P, and a resumption-cost threshold value $\text{ThrRes}_v$, as described above, for a resource instance v.

The initialization of step 101 may comprise definition of substitutability rules for one or more resource types, definition of resumption plans for one or more projects, and definition of allocation procedures for one or more projects.

One or more threshold values, substitutability rules, resumption plans, or allocation procedures may be derived fully or in part from clients of, members of, or other persons or entities associated with the organization. One or more threshold values, substitutability rules, resumption plans, or allocation procedures may be derived fully or in part from third-party documentation, licensing agreements, service agreements, other contractual obligations, other documents, or some combination thereof. One or more parameters, values, relations, definitions, rules, plans, and procedures may not be fully or partly defined, assigned, or initialized.

In step 103, a resource-dependency graph $G_v$ may be constructed for each resource instance v defined and initialized in step 101, according to one or more of the dependency relationships defined and initialized in step 101.

Step 105 initiates an iterative process that comprises steps 105-121 and which may be repeated once for each resource instance v.

Step 107 determines direct and indirect effects that a disruption of resource instance v may have upon other resource types and upon other resource instances. Said determining may identify an available capacity of a resource type in a scenario wherein resource instance v is disrupted. Said determining may be performed by traversing some or all of said dependency graphs constructed in step 103. In embodiments wherein one or more dependency graphs are represented as directed graphs, said determining may be fully or partially performed by traversing some or all directed paths of said dependency graphs represented as directed graphs, wherein said traversal may be implemented as any of the directed graph-traversal algorithms that are well-known to those skilled in the art of mathematical modeling. Step 107 may determine that a disruption of a resource instance v may directly or indirectly result in cascading effects upon the capacities of a plurality of resource types or upon the capacities of a plurality of resource instances.

Step 109 initiates an iterative process that comprises steps 109-113, wherein a set of iterations of the process initiated by step 109 may be nested within an iteration of the process initiated by step 105, wherein an iteration of the process initiated by step 105 may be performed once for a resource instance v, and wherein an iteration of said nested set of iterations of the process initiated by step 109 may be performed once for a resource type r.

The iterative process initiated by step 109 may be performed for only affected resource types r, wherein the capacity of an affected resource type r may be directly or indirectly reduced or otherwise affected by a disruption of resource instance v.

Step 111 determines whether a disruption of resource instance v directly or indirectly reduces the capacity of resource type r to a value below resource type r's capacity threshold value $ThrCap_r$. If a disruption of resource instance v may directly or indirectly reduce the capacity of resource type r to a value below said $ThrCap_r$, then step 113 may be performed.

Step 111 may comprise other methods of determination that, rather than compare the capacity of resource type r to a fixed threshold value, might select a default determination that may be a function of a resource type associated with the determination or of a resource instance associated with the determination, or might use other criteria to determine whether step 113 should be performed. Such determinations may, for example, compare the capacity of resource type r to a variable threshold value, add contingent steps to the determination method, or employ one or more threshold values that depend upon extrinsic parameters that may include, but are not limited to, time of day, season of the year, energy costs, environmental factors, political considerations, geographical constraints, economic factors, or constraints on the availability of some combination of other organizational resources.

If a disruption of resource instance v does not directly or indirectly reduce the capacity of resource type r to a value below said $ThrCap_r$, no action is taken and the iterative process initiated in step 109 begins a next iteration for the next value of resource type r. These iterations of the iterative process initiated in step 109 continue until the iterative process initiated in step 109 has considered all possible values of resource type r, at which point the iterative process of step 109 terminates and step 115 may be performed.

Step 113 may be performed when step 111 determines that a disruption of resource instance v may directly or indirectly reduce the capacity of resource type r to a value below resource type r's capacity threshold value $ThrCap_r$. In other embodiments, step 113 may be performed when other determination criteria, as described above, are satisfied.

In response to this determination, Step 113 identifies resource instance v as "critical for resource type r." This identification may be phrased differently, wherein said different phrasing communicates the determination that a disruption of resource instance v may directly or indirectly place resource type r in a critical state. Such different phrasings may include, but are not limited to "resource v is critical for resource r," or "resource r is critically dependent upon resource v."

After the completion of step 113, the iterative process initiated in step 109 begins a next iteration, wherein said next iteration considers a next value of resource type r. These iterations continue until the process initiated in step 109 has considered all permissible values of resource type r, at which point the iterative process initiated by step 109 terminates and step 115 may be performed.

Iterations of the iterative process of steps 109-113 may identify v as critical for no resource types or as critical for one or more resource types.

Step 115 identifies one or more affected projects that are directly or indirectly rendered infeasible by a disruption of resource instance v. Said identification may be a function of a list of dependent resource types created by one set of iterations of the iterative process of steps 109-113, wherein a disruption of resource instance v directly or indirectly reduces a capacity of a dependent resource type of said list of dependent resource types to a value less than a value of a minimum-capacity threshold value associated with said dependent resource type.

Step 117 may identify a total resumption cost $ThrRes_v$, incurred by resuming all affected projects that may be directly or indirectly rendered infeasible by a disruption of a resource instance v. In some embodiments, step 117 may identify a total resumption cost incurred by resuming a subset of said all affected projects that may be directly or indirectly rendered infeasible by a disruption of a resource instance v. Some or all of said affected projects may have been identified in step 115.

A resumption cost may be a function of a combination of direct or indirect project-resumption costs that may include substitution costs, time-delay costs, and other costs that may be directly or indirectly related to the resumption of one or more affected projects that may be directly or indirectly related to a disruption of resource instance v. Resumption costs may be a function of other parameters, relationships, and entities that may comprise, but are not limited to, the organization's substitutability rules, allocation procedures, resumption plans, dependency relationships, geographic hierarchy, or distances in a geographic hierarchy between resource instances.

Step 119 determines whether said total resumption cost identified by step 117 exceeds a resource instance v resumption-cost threshold value $ThrRes_v$. If said total resumption cost does exceed said resumption-cost threshold, then step 121 may be performed. If said total resumption cost does not exceed said resumption-cost threshold, then the iterative process initiated in step 105 begins a next iteration, wherein said next iteration considers the next value of resource instance v. Said iterations of the iterative process initiated in step 105 continue until the process initiated in step 105 has considered all permissible values of resource instance v, at which point the iterative process of steps 105-121 terminates and the process of FIG. 1 is complete.

In embodiments, step 119 may comprise determinations that, rather than compare a total resumption cost to a fixed threshold value, might select a default determination that may be a function of a resource type associated with said determination, a resource instance associated with said determination, or a funding source associated with said determination, or might use other criteria to determine whether step 121 should be performed. Such a determination may, for example, compare a total resumption cost to a variable threshold value, perform contingent steps, compare a total resumption cost to a different value or functional result, compare a cost that is determined in a different manner, or employ one or more threshold values that depend upon extrinsic parameters that may include, but are not limited to, time of day, season of the year, energy costs, environmental factors, political considerations, geographical constraints, economic factors, or constraints on the availability of some combination of other organizational resources.

If step 119 determines that its test criteria are satisfied for resource instance v, then step 121 identifies resource instance v as "critical" and the iterative process initiated in step 105 begins a next iteration, wherein said next iteration considers a next value of resource instance v. These iterations continue until the process initiated in step 105 has considered all permissible values of resource instance v, at which point the iterative process of step 105-121 terminates and the process of FIG. 1 completes.

Upon the completion of the final iteration of the iterative process of steps 105-121, embodiments of the present invention may have automatically identified: i) a list of resource instances that are identified as "critical" to the organization; and ii) a list of resource instances that are each identified as critical for a resource type. In some embodiments, resource instances on both these lists may be more simply identified as "critical."

Figure 2:
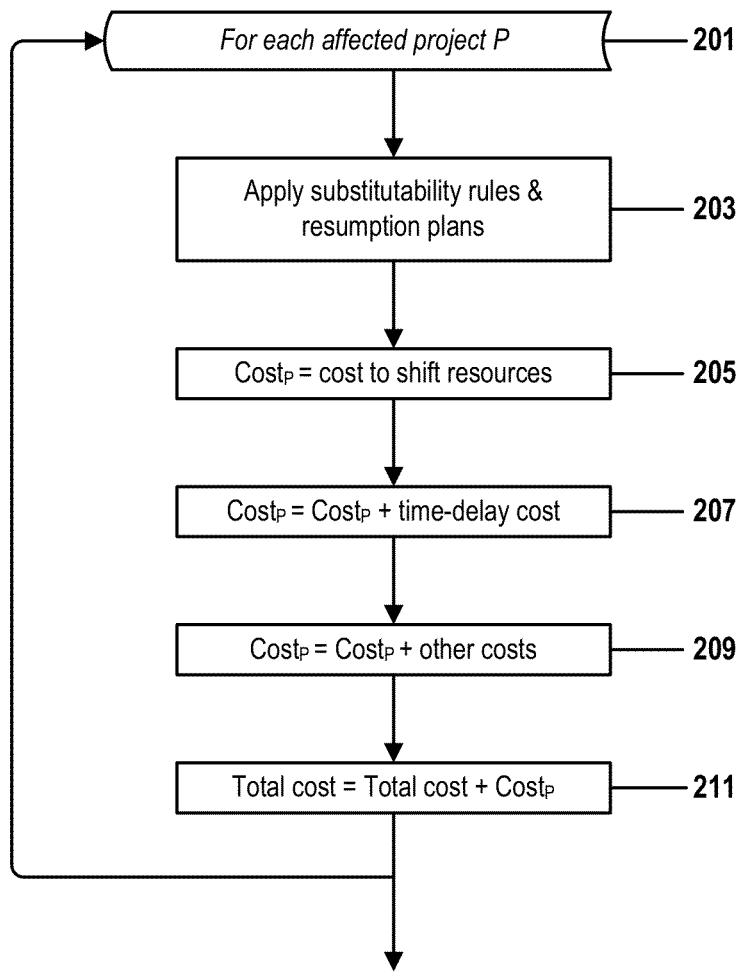
FIG. 2 is a flow chart that illustrates step 117 of FIG. 1 in more detail, wherein step 117, in conformance with embodiments of the present invention, identifies a total resumption cost directly or indirectly caused by a disruption of an initially disrupted resource instance v.

FIG. 2 is a flow chart that illustrates step 117 of FIG. 1 in more detail, wherein step 117, in conformance with embodiments of the present invention, identifies a total resumption cost directly or indirectly caused by a disruption of an initially disrupted resource instance v. FIG. 2 comprises steps 201-211.

A total resumption cost may be a function of a plurality of project-resumption costs, wherein a project-resumption cost of said plurality of project-resumption costs may comprise a cost to resume an affected project that has been directly or indirectly rendered infeasible by a disruption of a resource instance v.

In other embodiments, a total resumption cost may be a function of a subset of said plurality of project-resumption costs, wherein said subset may comprise a cost to resume a subset of all affected projects, wherein said affected projects have been directly or indirectly rendered infeasible by a disruption of a resource instance v.

Step 201 initiates the iterative process of steps 201-211, wherein an iteration of said iterative process may be performed for an affected project P. Said affected project P may be a project that has been identified as an affected project by step 115 of FIG. 1, and has been directly or indirectly rendered infeasible by a disruption of a resource instance v. One full set of iterations of the iterative process of steps 201-211 may consider unaffected instances of project P, where said unaffected instances represent projects that are not directly or indirectly rendered infeasible by a disruption of a resource instance v.

The iterative process of steps 201-211 may identify a resumption cost $Cost_P$ for an affected project P, and may then add a value of said identified $Cost_P$ to a running total cost of resumption. Said total cost of resumption may be a function of all the costs incurred by the resumption of some or all affected projects, wherein said affected projects have been directly or indirectly rendered infeasible by a disruption of a resource instance v. In other embodiments, said total cost of resumption may have been initialized to a null value or to some other default value or functional result prior to commencement of a first iteration of the iterative process of steps 201-211.

An iteration of the iterative process of steps 201-211 considers one affected project P. Instances of P are considered by said the iterative process of steps 201-211 in order of decreasing priority, wherein a greater priority is associated with an instance of P deemed to be of greater importance to the organization.

Step 203 may apply one or more substitutability rules in order to resume an affected project P that has been rendered infeasible by a disruption of a resource instance v. Substitutability rules may permit an affected project to resume operation by allowing the affected project P to replace unavailable units of a first resource type, wherein P is rendered infeasible by the lack of said unavailable units, with substitute units of an available second resource type.

It may not be possible to resume one or more projects by applying substitutability rules. An organization may have no substitutability rules that are applicable to an affected project P and an initially disrupted resource instance v when P has been directly or indirectly rendered infeasible by a disruption of v. In some embodiments, default substitutability rules may be applied, wherein decisions about resource substitutions may be made as a function of the distance between resources in a geographic hierarchy, or as a function of other parameters, procedures, priorities, guidelines, or constraints specified by the organization.

Step 203 may apply one or more project P resumption plans in conjunction with, or in place of, substitutability rules, wherein a project P resumption plan may state a set of actions that may be taken in order to resume project P after P has been rendered infeasible by a disruption of one or more resource types.

Upon completion of the application of substitutability rules or resumption plans, or upon the completion of other actions and procedures associated with the resumption of affected project P, step 203 may have performed steps that in aggregate may restore affected project P to operation, wherein said P was directly or indirectly rendered infeasible by a disruption of a resource instance v.

In step 205, $Cost_P$, wherein $Cost_P$ is an accumulated cost to resume affected project P, may be initialized to a resource-shifting cost incurred by shifting or reallocating units of available resources to affected project P in order to replace units of one or more resource instances that had directly or indirectly been rendered unavailable to said project P by a disruption of a resource instance v. Said resource-shifting cost may be known as a substitution cost. A substitution cost may comprise other costs associated with the resumption of a project rendered infeasible by the unavailability of a resource required by said infeasible project.

A plurality of details may affect the value of said resource-shifting cost, wherein said details may comprise, but are not limited to: a type of, an instance of, or a number of units of resources to be shifted to an affected project P; or a type of, an instance of, or a number of units of said project P's resources to be replaced. Said details may be defined by one or more applicable substitutability rules, resumption plans, or other actions and procedures associated with the resumption of said project P.

A resource-shifting cost may be defined as a cost to shift a project P to available substitute resources. Substitutability rules, but not resumption plans, may identify a resource-shifting cost.

In embodiments, $Cost_P$, a cost to resume project P, may be initialized to a null value, to a fixed value, or to some other value. A resource-shifting cost may be initialized as a function of one or more default substitutability rules, wherein said one or more default substitutability rules may predict substitution costs as a function of a geographic distance between a replacing resource instance and a replaced resource instance, as a function of a length of a path on a geographic hierarchy graph between a replacing resource instance and a replaced resource instance, or as a function of other parameters, guidelines, rules, or constraints specified by the organization. In embodiments wherein a resource-shifting cost or an other substitution cost may be predicted or estimated as a function of a distance on a geographic hierarchy graph between a replacing resource instance and a replaced resource instance, said costs may be predicted as a function of a shortest path on a geographic hierarchy graph between a replacing resource instance and a replaced resource instance. If a geographic hierarchy graph is represented as a directed graph, a length of a path on said geographic hierarchy graph may be a function of a number of nodes along said path.

Step 207 may increase a $Cost_P$ value by a time-delay cost for project P, wherein aid $Cost_P$ value may have been initialized in step 205. Said time-delay cost for project P may be a function of the length of time required to resume project P by replacing one or more resource instances that had been directly or indirectly made unavailable to affected project P by a disruption of a resource instance v, and wherein said project P is infeasible during said length of time.

A time-delay cost may be a result of a contractual obligation to one or more customers, of a productivity loss, of a direct or an indirect effect of said project P's infeasibility on other projects or customers, of a cost that may be a function of a length of time during which said project P is infeasible, or of a cost that may be a function of a length of time required to resume said infeasible project P.

It is possible that no time-delay cost may be applicable to a project P directly or indirectly rendered infeasible by a disruption of a resource instance v. In embodiments, a time-delay cost may equal a null value, a contingent value, a functional result, a preset default value, or an other value that may be associated with delays incurred during a resumption of said project P.

Step 209 may further increase the value of $Cost_P$ by the value of one or more other costs, wherein said one or more other costs may be direct or indirect results of steps taken to resume project P after P has been directly or indirectly rendered infeasible by a disruption of a resource instance v. Said one or more other costs may be a function of direct or indirect effects of a disruption of a resource instance v. It is possible that no said one or more other costs may be associated with a resumption of a project P directly or indirectly rendered infeasible by a disruption of resource instance v. Said one or more other costs may equal a null value, a contingent value, a value returned by a function, a preset default value, or to some other value.

In step 211, a total cost to the organization of resuming one or more affected projects that have directly or indirectly been rendered infeasible by a disruption of a resource instance v is incremented by a value of $Cost_P$ set in step 209, wherein said value of $Cost_P$ set in step 209 is a total cost to resume only one instance of project P.

A current iteration of the iterative process of steps 201-211 may terminate at a conclusion of step 211 and a next iteration of the iterative process of steps 201-211 may then begin considering a next instance of project P. Step 211 will have, at said time of termination, determined an interim value of a total cost to the organization of resuming one or more projects that have been rendered directly or indirectly infeasible by a disruption of a resource instance v. Step 211 of said next iteration may increase said interim value by a value of a cost to resume said next instance of project P.

If the iterative process of steps 201-211 has been performed for all projects directly or indirectly affected by a disruption of a resource instance v, the procedure of steps 201-211 of FIG. 2 may terminate.

Upon termination, the procedure of steps 201-211 may return an accumulated total of direct and indirect costs to resume one or more projects directly or indirectly rendered infeasible by a disruption of a resource instance v. Said accumulated total direct and indirect costs may comprise a total cost to the organization of resuming all projects that have directly or indirectly been rendered infeasible by a disruption of resource instance v.

Figure 3:
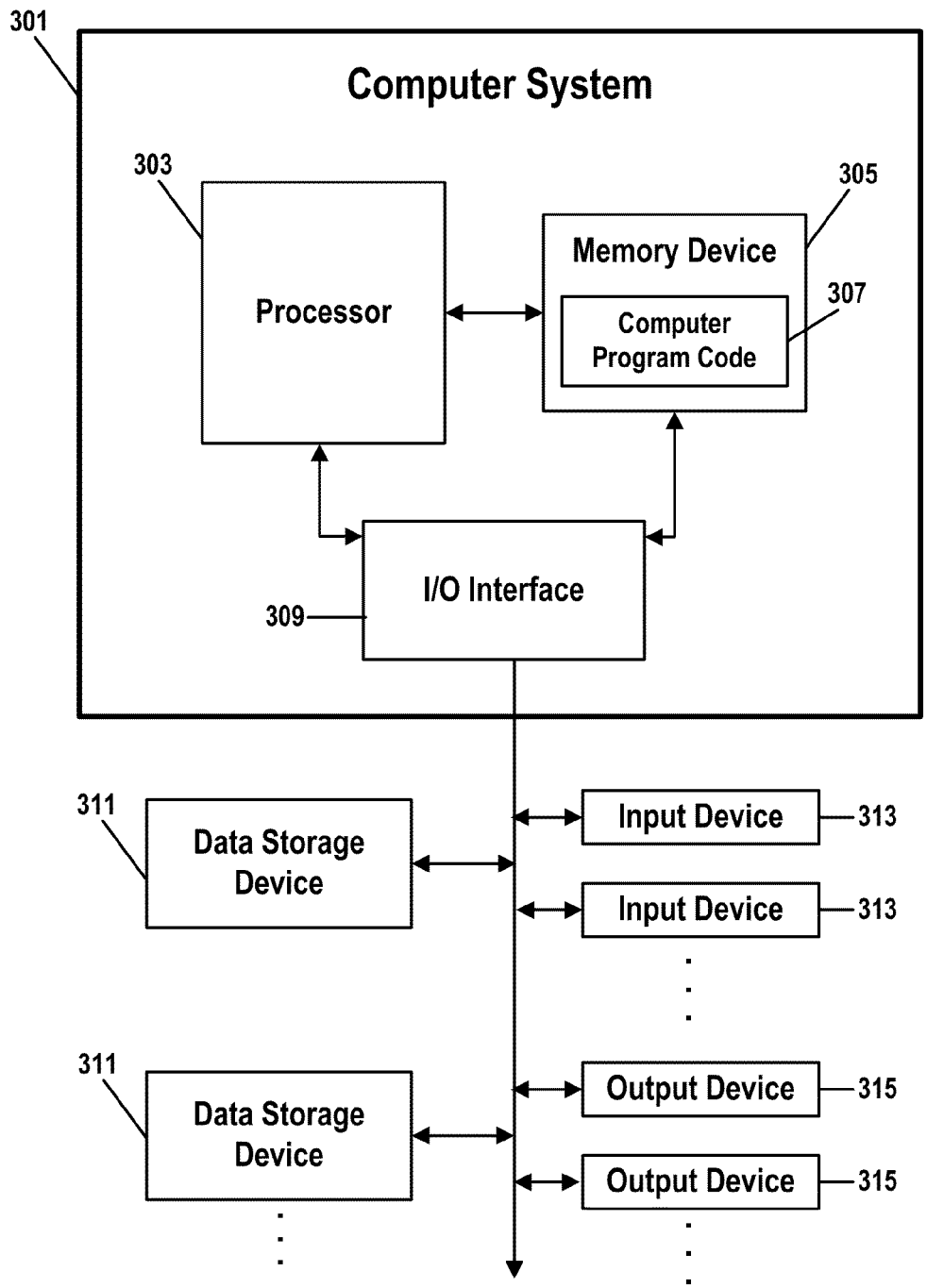
FIG. 3 shows the structure of a computer system and computer program code that may be used for automatically identifying critical resources of an organization, in accordance with embodiments of the present invention.

FIG. 3 shows the structure of a computer system and computer program code that may be used for automatically identifying critical resources of an organization, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, in one embodiment, the present invention may take the form of a computer program product comprising one or more physically tangible (e.g., hardware) computer-readable medium(s) or devices having computer-readable program code stored therein, said program code configured to be executed by a processor of a computer system to implement the methods of the present invention. In one embodiment, the physically tangible computer readable medium(s) and/or device(s) (e.g., hardware media and/or devices) that store said program code which implement methods of the present invention do not comprise a signal generally, or a transitory signal in particular.

Any combination of one or more computer-readable medium(s) or devices may be used. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium or device may include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of this document, a computer-readable storage medium may be any physically tangible medium or hardware device that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above and below with reference to flowchart illustrations and/or block diagrams of methods, apparatus (systems) and computer program products according to embodiments of the present invention. It will be understood that each block of the flowchart illustrations, block diagrams, and combinations of blocks in the flowchart illustrations and/or block diagrams of FIG. 1 and FIG. 2 can be implemented by computer program instructions. These computer program instructions may be provided to a processor of a general purpose computer, special purpose computer, or other programmable data-processing apparatus to produce a machine, such that the instructions, which execute via the processor of the computer or other programmable data-processing apparatus, create means for implementing the functions/acts specified in the flowchart and/or block diagram block or blocks.

These computer program instructions may also be stored in a computer-readable medium that can direct a computer, other programmable data-processing apparatus, or other devices to function in a particular manner, such that the instructions stored in the computer-readable medium produce an article of manufacture, including instructions which implement the function/act specified in the flowchart and/or block diagram block or blocks.

The computer program instructions may also be loaded onto a computer, other programmable data-processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart illustrations and/or block diagrams FIG. 1 and FIG. 2 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts, or combinations of special-purpose hardware and computer instructions.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 is also connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for automatically identifying critical resources of an organization, in accordance with embodiments of the present invention and may implement other embodiments described in this specification, including the methods illustrated in FIG. 1 AND FIG. 2. The data storage devices 311 may store the computer program code 307. Computer program code 307 stored in the storage devices 311 is configured to be executed by processor 303 via the memory devices 305. Processor 303 executes the stored computer program code 307.

Thus the present invention discloses a process for supporting computer infrastructure, integrating, hosting, maintaining, and deploying computer-readable code into the computer system 301, wherein the code in combination with the computer system 301 is capable of performing a method for automatically identifying critical resources of an organization.

Any of the components of the present invention could be created, integrated, hosted, maintained, deployed, managed, serviced, supported, etc. by a service provider who offers to facilitate a method of automatically identifying critical resources of an organization. Thus the present invention discloses a process for deploying or integrating computing infrastructure, comprising integrating computer-readable code into the computer system 301, wherein the code in combination with the computer system 301 is capable of performing a method for automatically identifying critical resources of an organization.

One or more data storage units 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise said computer-readable hardware storage device.

What is claimed is:

1. A method for automatically identifying critical resources of an organization, wherein said organization comprises a plurality of resource instances, wherein a resource instance of said plurality of resource instances is associated with a resource type of a plurality of resource types, wherein said organization comprises a plurality of projects, wherein a project of said plurality of projects comprises a demand for a capacity of a resource type of said plurality of resource types, and wherein a disruption of a first resource instance of said plurality of resource instances results in an unavailability of a unit of a second instance of said plurality of resource instances, said method comprising:
    a processor of a computer system receiving one or more dependency relationships, wherein a dependency relationship of said one or more dependency relationships relates an independent resource instance of said plurality of resource instances with a dependent resource instance of said plurality of resource instances, and wherein a disruption of said independent resource instance results in an unavailability of a unit of said dependent resource instance;
    said processor determining a disrupted capacity of a disrupted resource type of said plurality of resource types, wherein said disrupted capacity is a function of an initial disruption of an initially disrupted resource instance of said plurality of resource instances, and wherein said disrupted capacity is a further function of said one or more dependency relationships;
    said processor categorizing said initially disrupted resource instance as being critical for said disrupted resource type, wherein said categorizing is a function of said disrupted capacity of said disrupted resource type.

2. The method of claim 1, said method further comprising said processor further categorizing said initially disrupted resource instance as critical to the organization, wherein said further categorizing is a function of a resumption cost incurred by resuming one or more disrupted projects of said plurality of projects, and wherein said one or more disrupted projects are initially rendered infeasible by said initial disruption of said initially disrupted resource instance.

3. The method of claim 2, wherein a resumption cost comprises at least one of a substitution cost and a time-delay cost, wherein said substitution cost is a function of a cost of substituting a number of substitute units of an available resource instance of said plurality of resource instances for an unavailable unit of an unavailable resource instance of said plurality of resource instances, wherein said unavailable unit is unavailable as a result of said initial disruption of said initially disrupted resource instance, and wherein said time-delay cost is a function of a length of time required to perform said substituting.

4. The method of claim 3, wherein said substituting is constrained by a substitutability rule of a plurality of substitutability rules, wherein said substitutability rule specifies a project of said plurality of projects, a project resource type of said plurality of resource types, and a substitute resource type of said plurality of resource types, wherein said project requires said project resource type, and wherein said substitutability rule further specifies a number of units of said substitute resource type that may be substituted for an unavailable unit of said project resource type.

5. The method of claim 3, wherein said time-delay cost is a function of a distance on a geographic hierarchy graph between a substitute unit of said number of substitute units and said unavailable unit, and wherein said geographic hierarchy graph represents a geographic distribution of said plurality of resource instances.

6. The method of claim 1, wherein said one or more dependency relationships are represented as one or more directed graphs, wherein said further function of said one or more dependency relationships comprises traversing a directed path of said one or more directed graphs, and wherein said path comprises a node that represents said initially disrupted resource instance.

7. The method of claim 1, wherein said categorizing comprises comparing said disrupted capacity to a threshold value.

8. A computer program product, comprising a computer-readable hardware storage device having a computer-readable program code stored therein, said program code configured to be executed by a processor of a computer system to implement a method for automatically identifying critical resources of an organization, wherein said organization comprises a plurality of resource instances, wherein a resource instance of said plurality of resource instances is associated with a resource type of a plurality of resource types, wherein said organization comprises a plurality of projects, wherein a project of said plurality of projects comprises a demand for a capacity of a resource type of said plurality of resource types, and wherein a disruption of a first resource instance of said plurality of resource instances results in an unavailability of a unit of a second instance of said plurality of resource instances, said method comprising:
    a processor of a computer system receiving one or more dependency relationships, wherein a dependency relationship of said one or more dependency relationships relates an independent resource instance of said plurality of resource instances with a dependent resource instance of said plurality of resource instances, and wherein a disruption of said independent resource instance results in an unavailability of a unit of said dependent resource instance;
    said processor determining a disrupted capacity of a disrupted resource type of said plurality of resource types, wherein said disrupted capacity is a function of an initial disruption of an initially disrupted resource instance of said plurality of resource instances, and wherein said disrupted capacity is a further function of said one or more dependency relationships;
    said processor categorizing said initially disrupted resource instance as being critical for said disrupted resource type, wherein said categorizing is a function of said disrupted capacity of said disrupted resource type.

9. The computer program product of claim 8, said method further comprising said processor further categorizing said initially disrupted resource instance as critical to the organization, wherein said further categorizing is a function of a resumption cost incurred by resuming one or more disrupted projects of said plurality of projects, and wherein said one or more disrupted projects are initially rendered infeasible by said initial disruption of said initially disrupted resource instance.

10. The computer program product of claim 9, wherein a resumption cost comprises at least one of a substitution cost and a time-delay cost, wherein said substitution cost is a function of a cost of substituting a number of substitute units of an available resource instance of said plurality of resource instances for an unavailable unit of an unavailable resource instance of said plurality of resource instances, wherein said unavailable unit is unavailable as a result of said initial disruption of said initially disrupted resource instance, and wherein said time-delay cost is a function of a length of time required to perform said substituting.

11. The computer program product of claim 10, wherein said substituting is constrained by a substitutability rule of a plurality of substitutability rules, wherein said substitutability rule specifies a project of said plurality of projects, a project resource type of said plurality of resource types, and a substitute resource type of said plurality of resource types, wherein said project requires said project resource type, and wherein said substitutability rule further specifies a number of units of said substitute resource type that may be substituted for an unavailable unit of said project resource type.

12. The computer program product of claim 10, wherein said time-delay cost is a function of a distance on a geographic hierarchy graph between a substitute unit of said number of substitute units and said unavailable unit, and wherein said geographic hierarchy graph represents a geographic distribution of said plurality of resource instances.

13. The computer program product of claim 8, wherein said one or more dependency relationships are represented as one or more directed graphs, wherein said further function of said one or more dependency relationships comprises traversing a directed path of said one or more directed graphs, and wherein said path comprises a node that represents said initially disrupted resource instance.

14. A computer system comprising a processor, a memory coupled to the processor, and a computer-readable hardware storage device coupled to said processor, said storage device containing program code configured to be run by the processor via the memory to implement a method for automatically identifying critical resources of an organization, wherein said organization comprises a plurality of resource instances, wherein a resource instance of said plurality of resource instances is associated with a resource type of a plurality of resource types, wherein said organization comprises a plurality of projects, wherein a project of said plurality of projects comprises a demand for a capacity of a resource type of said plurality of resource types, and wherein a disruption of a first resource instance of said plurality of resource instances results in an unavailability of a unit of a second instance of said plurality of resource instances, said method comprising:

a processor of a computer system receiving one or more dependency relationships, wherein a dependency relationship of said one or more dependency relationships relates an independent resource instance of said plurality of resource instances with a dependent resource instance of said plurality of resource instances, and wherein a disruption of said independent resource instance results in an unavailability of a unit of said dependent resource instance;

said processor determining a disrupted capacity of a disrupted resource type of said plurality of resource types, wherein said disrupted capacity is a function of an initial disruption of an initially disrupted resource instance of said plurality of resource instances, and wherein said disrupted capacity is a further function of said one or more dependency relationships;

said processor categorizing said initially disrupted resource instance as being critical for said disrupted resource type, wherein said categorizing is a function of said disrupted capacity of said disrupted resource type.

15. The system of claim 14, said method further comprising said processor further categorizing said initially disrupted resource instance as critical to the organization, wherein said further categorizing is a function of a resumption cost incurred by resuming one or more disrupted projects of said plurality of projects, and wherein said one or more disrupted projects are initially rendered infeasible by said initial disruption of said initially disrupted resource instance.

16. The system of claim 15, wherein a resumption cost comprises at least one of a substitution cost and a time-delay cost, wherein said substitution cost is a function of a cost of substituting a number of substitute units of an available resource instance of said plurality of resource instances for an unavailable unit of an unavailable resource instance of said plurality of resource instances, wherein said unavailable unit is unavailable as a result of said initial disruption of said initially disrupted resource instance, and wherein said time-delay cost is a function of a length of time required to perform said substituting.

17. The system of claim 16, wherein said substituting is constrained by a substitutability rule of a plurality of substitutability rules, wherein said substitutability rule specifies a project of said plurality of projects, a project resource type of said plurality of resource types, and a substitute resource type of said plurality of resource types, wherein said project requires said project resource type, and wherein said substitutability rule further specifies a number of units of said substitute resource type that may be substituted for an unavailable unit of said project resource type.

18. The system of claim 16, wherein said time-delay cost is a function of a distance on a geographic hierarchy graph between a substitute unit of said number of substitute units and said unavailable unit, and wherein said geographic hierarchy graph represents a geographic distribution of said plurality of resource instances.

19. The system of claim 14, wherein said one or more dependency relationships are represented as one or more directed graphs, wherein said further function of said one or more dependency relationships comprises traversing a directed path of said one or more directed graphs, and wherein said path comprises a node that represents said initially disrupted resource instance.

20. A process for supporting computer infrastructure, said process comprising providing at least one support service for at least one of creating, integrating, hosting, maintaining, and deploying computer-readable program code in a computer system, wherein the program code in combination with the computer system is configured to implement a method for automatically identifying critical resources of an organization, wherein said organization comprises a plurality of resource instances, wherein a resource instance of said plurality of resource instances is associated with a resource type of a plurality of resource types, wherein said organization comprises a plurality of projects, wherein a project of said plurality of projects comprises a demand for a capacity of a resource type of said plurality of resource types, and wherein a disruption of a first resource instance of said plurality of resource instances results in an unavailability of a unit of a second instance of said plurality of resource instances, said method comprising:
- a processor of a computer system receiving one or more dependency relationships, wherein a dependency relationship of said one or more dependency relationships relates an independent resource instance of said plurality of resource instances with a dependent resource instance of said plurality of resource instances, and wherein a disruption of said independent resource instance results in an unavailability of a unit of said dependent resource instance;
- said processor determining a disrupted capacity of a disrupted resource type of said plurality of resource types, wherein said disrupted capacity is a function of an initial disruption of an initially disrupted resource instance of said plurality of resource instances, and wherein said disrupted capacity is a further function of said one or more dependency relationships;
- said processor categorizing said initially disrupted resource instance as being critical for said disrupted resource type, wherein said categorizing is a function of said disrupted capacity of said disrupted resource type.

21. The process of claim 20, said method further comprising said processor further categorizing said initially disrupted resource instance as critical to the organization, wherein said further categorizing is a function of a resumption cost incurred by resuming one or more disrupted projects of said plurality of projects, and wherein said one or more disrupted projects are initially rendered infeasible by said initial disruption of said initially disrupted resource instance.

22. The process of claim 21, wherein a resumption cost comprises at least one of a substitution cost and a time-delay cost, wherein said substitution cost is a function of a cost of substituting a number of substitute units of an available resource instance of said plurality of resource instances for an unavailable unit of an unavailable resource instance of said plurality of resource instances, wherein said unavailable unit is unavailable as a result of said initial disruption of said initially disrupted resource instance, and wherein said time-delay cost is a function of a length of time required to perform said substituting.

23. The process of claim 22, wherein said substituting is constrained by a substitutability rule of a plurality of substitutability rules, wherein said substitutability rule specifies a project of said plurality of projects, a project resource type of said plurality of resource types, and a substitute resource type of said plurality of resource types, wherein said project requires said project resource type, and wherein said substitutability rule further specifies a number of units of said substitute resource type that may be substituted for an unavailable unit of said project resource type.

24. The process of claim 22, wherein said time-delay cost is a function of a distance on a geographic hierarchy graph between a substitute unit of said number of substitute units and said unavailable unit, and wherein said geographic hierarchy graph represents a geographic distribution of said plurality of resource instances.

25. The process of claim 20, wherein said one or more dependency relationships are represented as one or more directed graphs, wherein said further function of said one or more dependency relationships comprises traversing a directed path of said one or more directed graphs, and wherein said path comprises a node that represents said initially disrupted resource instance.

* * * * *